(12) United States Patent
Zaykov et al.

(10) Patent No.: US 10,515,017 B2
(45) Date of Patent: Dec. 24, 2019

(54) MEMORY PARTITIONING FOR A COMPUTING SYSTEM WITH MEMORY POOLS

(71) Applicant: Honeywell International Inc., Morris Plains, NJ (US)

(72) Inventors: Pavel Zaykov, Brno (CZ); Lucie Matusova, Novy Jicin (CZ)

(73) Assignee: Honeywell International Inc., Morris Plains, NJ (US)

( * ) Notice: Subject to any disclaimer, the term of this patent is extended or adjusted under 35 U.S.C. 154(b) by 137 days.

(21) Appl. No.: 15/440,242

(22) Filed: Feb. 23, 2017

(65) Prior Publication Data

US 2018/0239709 A1 Aug. 23, 2018

(51) Int. Cl.
*G06F 12/00* (2006.01)
*G06F 12/0895* (2016.01)
(Continued)

(52) U.S. Cl.
CPC ........ *G06F 12/0895* (2013.01); *G06F 12/023* (2013.01); *G06F 12/0284* (2013.01); *G06F 12/0811* (2013.01); *G06F 12/0842* (2013.01); *G06F 12/0851* (2013.01); *G06F 2212/152* (2013.01); *G06F 2212/173* (2013.01); *G06F 2212/62* (2013.01)

(58) Field of Classification Search
CPC ............. G06F 12/0811; G06F 12/0842; G06F 12/0851; G06F 12/0895; G06F 2212/62
USPC ........................................................ 711/105
See application file for complete search history.

(56) References Cited

U.S. PATENT DOCUMENTS 6,751,739 B1    6/2004 Verdun
7,783,852 B2    8/2010 Lahiri et al.
(Continued)

FOREIGN PATENT DOCUMENTS

CN    103678155 A    3/2014
CN    105068940 A    11/2015
FR    3010201        3/2015

OTHER PUBLICATIONS

Kim et al., "Bounding Memory Interference Delay in COTS-based Multi-Core Systems", 2014, pp. 1-10, Publisher: Carnegie Mellon University.
(Continued)

*Primary Examiner* — Mohamed M Gebril
(74) *Attorney, Agent, or Firm* — Fogg & Powers LLC (57) ABSTRACT

A computing system comprises at least one processing unit, at least one memory controller in communication with the processing unit, and a main memory in communication with the processing unit through the memory controller. A memory hierarchy of the computing system includes at least one cache, the memory controller, and the main memory. The memory hierarchy is divided into a plurality of memory pools. The main memory comprises a set of memory modules split in ranks each having a rank address defined by a set of rank address bits. Each rank has a set of memory devices comprising one or more banks each having a bank address defined by a set of bank address bits. A plurality of threads execute on the processing unit, and are assigned to the memory pools based on one or more memory partitioning techniques, including bank partitioning, rank partitioning, or memory controller partitioning.

19 Claims, 7 Drawing Sheets

(51) Int. Cl.
G06F 12/0846 (2016.01)
G06F 12/0842 (2016.01)
G06F 12/0811 (2016.01)
G06F 12/02 (2006.01)

(56) References Cited

U.S. PATENT DOCUMENTS

| | | | | |
|---|---|---|---|---|
| 8,069,308 | B2* | 11/2011 | Larson | G06F 9/5016 |
| | | | | 711/117 |
| 8,943,287 | B1 | 1/2015 | Miller et al. | |
| 9,256,380 | B1* | 2/2016 | Daniel | H04L 49/30 |
| 9,612,868 | B2 | 4/2017 | Easwaran et al. | |
| 2002/0069318 | A1* | 6/2002 | Chow | G06F 3/0611 |
| | | | | 711/104 |
| 2009/0177849 | A1* | 7/2009 | Mazzola | G06F 13/1684 |
| | | | | 711/154 |
| 2009/0216939 | A1* | 8/2009 | Smith | G06F 13/4239 |
| | | | | 711/105 |
| 2011/0131377 | A1 | 6/2011 | Gray et al. | |
| 2011/0258420 | A1* | 10/2011 | Devadas | G06F 9/3824 |
| | | | | 712/225 |
| 2015/0039833 | A1* | 2/2015 | Chang | G06F 12/0848 |
| | | | | 711/129 |
| 2015/0089164 | A1* | 3/2015 | Ware | G11C 5/02 |
| | | | | 711/149 |
| 2015/0205724 | A1* | 7/2015 | Hancock | G06F 12/0888 |
| | | | | 711/129 |
| 2016/0239213 | A1 | 8/2016 | Liu et al. | |
| 2017/0109090 | A1* | 4/2017 | Chun | G06F 12/1009 |
| 2017/0336973 | A1* | 11/2017 | Chakraborty | G06F 12/0607 |
| 2018/0188976 | A1* | 7/2018 | Koo | G06F 12/06 |
| 2018/0239709 | A1* | 8/2018 | Zaykov | G06F 12/0895 |

OTHER PUBLICATIONS

Liu et al., "A Software Memory Partition Approach for Eliminating Bank-level Interference in Multicore Systems", PACT'12, Sep. 2012, Minneapolis, Minnesota, pp. 1-9.

Nowotsch et al., "Leveraging Multi-Core Computing Architectures in Avionics", 2012 Ninth European Dependable Computing Conference, 2012, pp. 132-143, Publisher: IEEE Computer Society, Published in: Munich, Germany.

Suzuki et al., "Coordinated Bank and Cache Coloring for Temporal Protection of Memory Accesses", In Proc. of the Int'l Conf. on Computational Science and Engineering (CSE), 2013, pp. 685-692.

DDC-I, Inc. "Deos, a Time & Space Partitioned, Multi-core Enabled, DO-178C DAL A Certifiable RTOS"; found at https://www.ddci.com/products_deos_do_178c_arinc_653/ ; Accesses on Aug. 15, 2018; pp. 1-3; Published: Phoenix, AZ.

European Patent Office; "Extended European search report from EP Application No. 18157513.5 dated Jul. 5, 2018"; from Foreign Counterpart of U.S. Appl. No. 15/440,242; pp. 1-10; dated: Jul. 5, 2018; Published: EP.

FAA "Certification Authorities Software Team (CAST)" Position Paper CAST-32A Multi-core Processors; Nov. 2016; pp. 1-23.

FAA; "Certification Authorities Software Team (CAST) Position Paper CAST-2"; Guidelines for Assessing Software Partitioning/Protection Schemes; Feb. 2001; pp. 1-7.

Jean Xavier, et. al; "The Use of MULticore proCessORS in Airborne Systems"; Research Project EASA.2011/6; Publisher: Thales Avionics; European Aviation Safety Agency; Dec. 16, 2012; pp. 1-163.

King Time; "Managing Cache Partitioning Multicore Processors for Certifiable, Safety-Critical Avionics Software Applications"; DDC-I Safety Critical Software Solutions for Mission Critical Systems; Presented at 33rd DASC; Oct. 5-9, 2014; pp. 1-21.

Liu Lei, et. al; "BPM/BPM+: Software-Based Dynamic Memory Partitioning Mechanisms for Mitigating DRAM Bank-/Channel-Level Interferences in Multicore Systems" ACM Transactions on Architecture and Code Optimization, Association for Computing Machinery; Published: US; vol. 11, No. 1; pp. 1-28; Dated Feb. 1, 2014.

NXP Semiconductors; "Product Longevity"; Found at www.nxp.com/webapp/ecommerce.show_cart/framework; Dated Jul. 26, 2018; pp. 1-3; NXP Semiconductors Reports Second Quarter 2018 Results.

Parkinson Paul; "The challenges of developing embedded real-time aerospace applications on next generation multi-core processors"; Publisher: Wind River; pp. 1-6; 2016.

Reineke Jan, et. al; "PRET DRAM Controller: Bank Privatization for Predictability and Temporal Isolation"; pp. 1-10; CODES+ISSS'11; Oct. 9-14, 2011; Published: US.

Zaykov Pavel, et al. "Apparatuses and Methods for Determining Efficient Memory Partitioning" U.S. Appl. No. 15/837,793, filed Dec. 11, 2017.

U.S. Patent and Trademark Office, "Notice of Allowance", U.S. Appl. No. 15/837,793, dated Mar. 26, 2019, pp. 1-30, Published: US.

* cited by examiner

MEMORY PARTITIONING FOR A COMPUTING SYSTEM WITH MEMORY POOLS

BACKGROUND

Among the most important requirements in an avionics system is to ensure the time and space partitioning of the running processes. Time partitioning is a technique which guarantees that the threads within a process get a predetermined portion of the processor time. To ensure that a predetermined portion of the processor time is sufficient to complete the thread execution, usually a safety margin is added on top of the measured Worst-Case Execution Time (WCET). Space partitioning refers to hardware-enforced limitations on memory accesses which prevent processes from corrupting each other's data. The time and space partitioning is guaranteed by a Real-Time Operating System (RTOS), typically running on a Commercial-Off-The-Shelf (COTS) single-core processor.

The complexity and computing power of avionics systems are ever increasing, while COTS single-core processors are becoming obsolete. Therefore, it is necessary to select new computer architectures to satisfy the avionics system needs. The available COTS multi-core processors tend to be some of the best candidates because of the high performance capabilities along with low Size, Weight and Power (SWaP) profile. Apart from the benefits, the COTS multi-core processors suffer from temporal effects of unpredictable contentions. As a result of the unpredictable contentions, the time-partitioning might be jeopardized.

Unpredictable contentions are introduced by accesses from multiple cores to the same shared hardware resources. Examples of shared hardware resources are caches, main memory, and Input/Output (I/O) interfaces. Unpredictable contentions result in conservative task timings and consequent penalized processor performance. Thus, there is a need to have a performance efficient technique which tackles the temporal effects of shared hardware resources in COTS multi-core processors.

In a COTS multi-core processor, the cache is a hardware resource, in which availability highly impacts application performance. If the cache is shared among the processor cores, then tasks mapped on different cores might invalidate each other's cache lines. As a result of the cross-core cache invalidation, the processor performance might be penalized.

In order to reduce the cross-core cache invalidation and respectively increase the processor performance, various approaches have been developed. In one approach, cache partitioning is provided via a mechanism called "memory pools" in the Deos RTOS from DDC-I that allows fine-grain control over which memory pages are included in each memory pool.

Although the memory pool concept has been successfully applied to partition the cache, there is still a high unpredictable contention in a COTS multi-core processor caused by significant interference in the main memory, which can be a Dynamic Random Access Memory (DRAM). The main memory is accessed by the processor with the help of one or multiple memory controllers.

In another approach, DRAM bank and cache coloring has been implemented using Linux kernel extensions to control the Memory Management Unit (MMU). This approach suggests that partitioning of the cache and main memory can bring a substantial performance improvement.

Accordingly, there is a need for addressing the problem of providing a performance-efficient partitioning of the memory hierarchy in a COTS multi-core processor.

SUMMARY

A computing system comprises at least one processing unit, at least one memory controller in operative communication with the at least one processing unit, with or without cache, and a main memory in operative communication with the at least one processing unit through the at least one memory controller. A memory hierarchy of the computing system includes at least one cache, the at least one memory controller, and the main memory, wherein the memory hierarchy is divided into a plurality of memory pools. The main memory comprises a set of memory modules split in ranks each having a rank address defined by a set of rank address bits, and each rank having a set of memory devices, each of the memory devices comprising one or more banks each having a bank address defined by a set of bank address bits. A plurality of threads execute on the at least one processing unit and are assigned to the memory pools based on one or more memory partitioning techniques comprising: bank partitioning, which uses the bank address bits to define a size and pattern of one or more of the memory pools; rank partitioning, which uses the rank address bits to access the one or more ranks; or memory controller partitioning, which uses memory controller interleaving.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Memory partitioning for a computing system, which is implemented with memory pools, is disclosed herein. In particular, the present approach provides a performance-efficient partitioning of a memory hierarchy in a Commercial-Off-The-Shelf (COTS) multi-core processor system. In the present approach, the memory pool concept is particularly exploited for use with Dynamic Random Access Memory (DRAM) devices.

The memory hierarchy to which the present approach can be applied includes one or multiple caches, one or multiple memory controllers, and one or multiple main memories. As used herein, "memory partitioning" refers to partitioning of the one or multiple caches, the one or multiple memory controllers, or the one or multiple main memories.

The present approach can be used to augment cache partitioning with memory partitioning, including bank partitioning, rank partitioning, and managing of multiple DRAM controller interleavings. The memory pools are implemented for the memory partitioning by taking into consideration various factors, including: the address bits to select memory banks; the number of active memory ranks, rank bits, and the type of interleaving; the number of active memory controllers, the granularity, and the type of interleaving; and optionally, the cache index address bits.

One or more of the memory partitioning techniques, including bank partitioning, rank partitioning, and memory controller partitioning, can be employed with conventional cache partitioning techniques to significantly reduce execution time cycles for each processing core, thereby yielding substantial increases in processing performance.

As the address bits to select DRAM banks are high enough in the address space, no additional modifications are required in existing memory pools implementations. As a result, the present approach is able to apply partitioning of the memory hierarchy solely using a proper configuration of the memory pools (offset and size).

The present memory partitioning techniques are particularly advantageous and beneficial in avionics applications, such as in an avionics platform onboard an aircraft that runs multiple simultaneous processes using an avionics computer system. In addition, the present memory partitioning techniques can be applied to both single-core processors, and multi-core processors.

Further details of the present approach are described hereafter with reference to the drawings.

Figure 1:
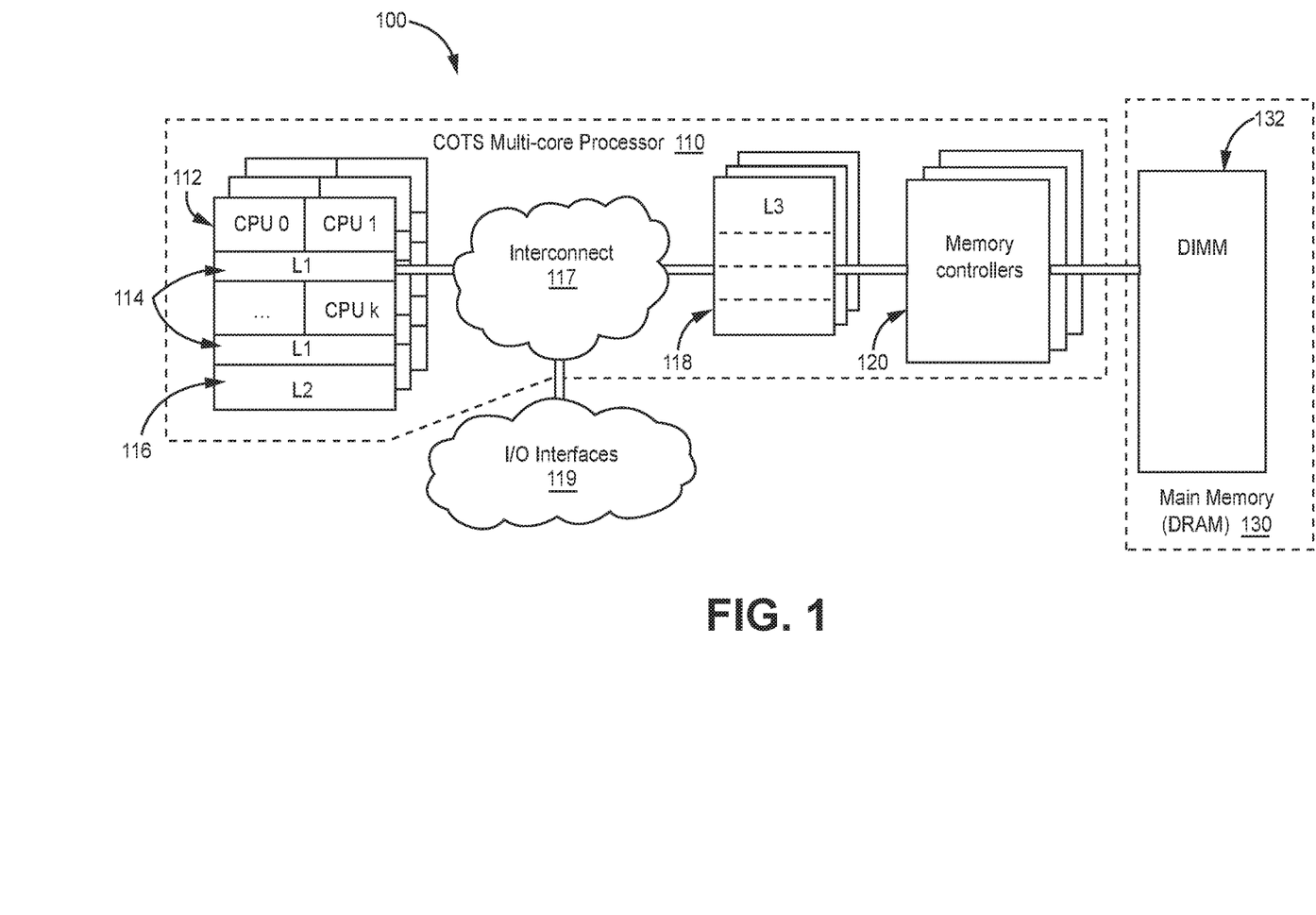
FIG. 1 is a block diagram of a multi-core processor architecture, according to one embodiment, which can be implemented with memory partitioning.

FIG. 1 illustrates a multi-core processor architecture 100, according to one embodiment, in which memory partitioning can be implemented. The multi-core processor architecture 100 generally comprises a COTS multi-core processor unit 110, and a memory hierarchy that includes one or more caches 114, 116, 118, one or more memory controllers 120, and a main memory unit 130 such as DRAM.

The COTS multi-core processor unit 110 includes one or more processor clusters 112, each of which comprise one or more central processing unit (CPU) cores (CPU 0, CPU 1, ... CPU k). The cores each have a private level 1 (L1) cache such as cache 114, and a shared level 2 (L2 cache) such as cache 116. The processor clusters 112 are operatively connected to the memory hierarchy through an interconnect 117. The interconnect 117 can also provide input/output connections between other I/O interfaces 119 and processor clusters 112.

In some implementations, at least one level 3 (L3) cache such as cache 118 is present, which is positioned between interconnect 117 and the memory hierarchy. The L3 cache 118 is often known as a platform cache and buffers memory accesses by the cores. The L3 cache 118 is operatively connected to one or more memory controllers 120, which order accesses to main memory 130.

The main memory unit 130 is operatively connected to the one or more processor clusters 112 through the one or more memory controllers 120. The main memory unit 130 comprises at least one memory module 132, such as a Dual In-line Memory Module (DIMM). The main memory unit 130 is the physical memory where data is stored and accessed at run-time.

In the DRAM memory architecture, each memory cell (a single bit) is implemented by a small capacitor. As time passes, the charge in the capacitor weakens, so without being explicitly refreshed the stored data would eventually be lost. To prevent data losses, extra hardware periodically reads and writes back to each memory cell (i.e., performs a refresh), restoring the capacitor charge to its original level. The DRAM refreshes are automatically conducted and are transparent to the user.

DRAM memory architecture offers three levels of parallelism, including memory controllers, ranks, and banks. Moreover, the number of ranks defines the number of banks. These levels of the DRAM memory architecture are discussed as follows.

Figure 2A:
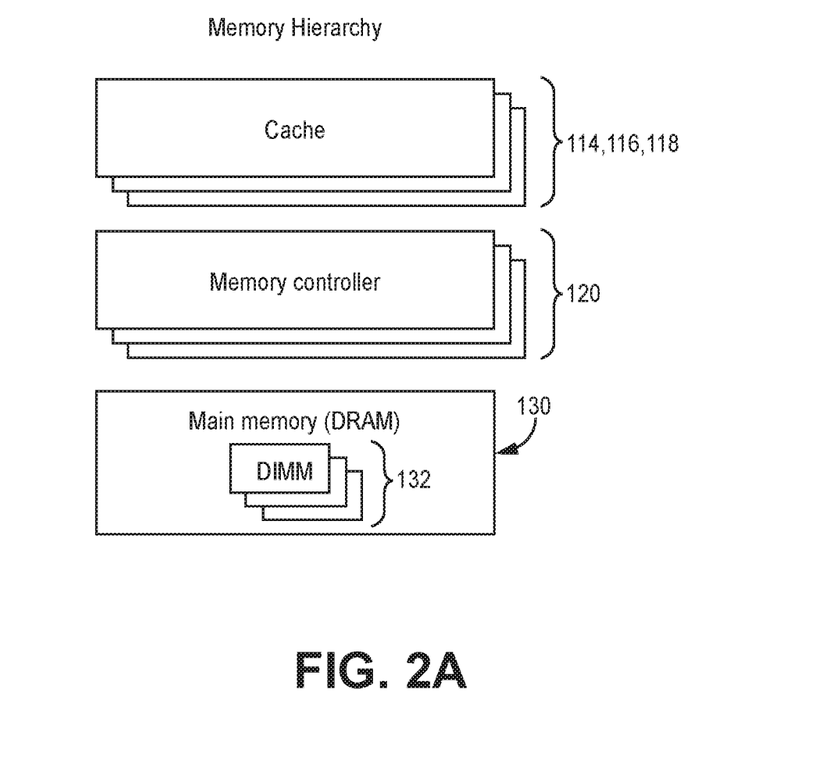
FIG. 2A is a block diagram of the memory hierarchy implemented in the multi-core processor architecture of FIG. 1.

FIG. 2A is a block diagram of the memory hierarchy implemented in the multi-core processor architecture 100 of FIG. 1. The memory hierarchy comprises the one or more caches 114, 116, 118, the one or more memory controllers 120, and the main memory 130 (DRAM), which can include one or more memory modules 132 such as one or more DIMMs. The DIMMs allow for rank interleaving, which is described hereafter.

Figures 2B, 2C:
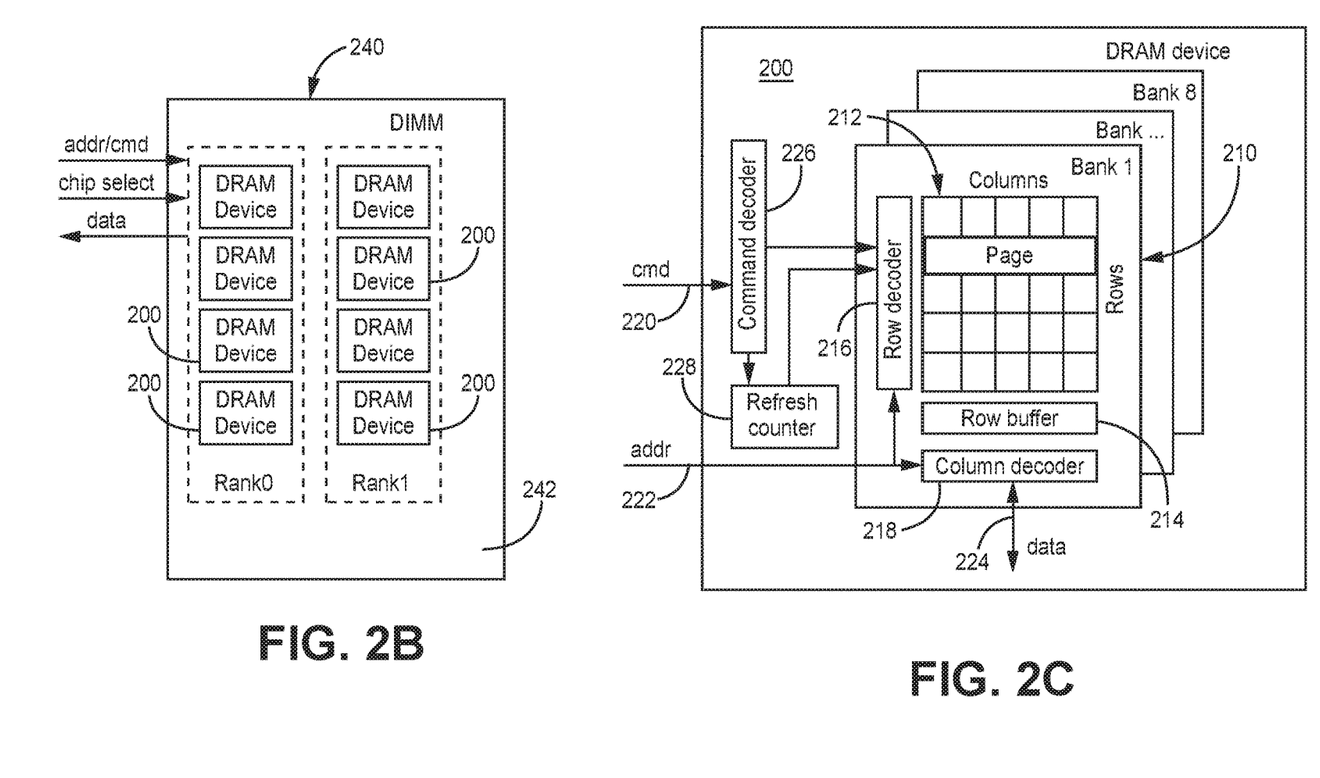
FIG. 2B is a block diagram of a typical arrangement of multiple Dynamic Random Access Memory (DRAM) devices in a dual in-line memory module, according to one embodiment, which can be implemented in the multi-core processor architecture of FIG. 1.
FIG. 2C is a block diagram of the architecture of a DRAM device, which can be implemented in the a dual in-line memory module of FIG. 2B.

FIG. 2B shows a typical arrangement of a DIMM 240, according to one embodiment. The DIMM 240 is typically organized in two ranks (e.g., Rank 0, Rank 1), which are connected to a circuit board 242. A rank is explicitly selected through a chip select signal. Each rank has a rank address that is defined by a set of rank address bits. Ranks are composed of a set of DRAM devices 200. All DRAM devices in a rank share address, data, and command buses.

FIG. 2C depicts the architecture of a single DRAM device 200, according to one embodiment, which can be implemented in DIMM 240. The DRAM device 200 includes a set of memory banks 210 (e.g., Bank 1 up to Bank 8), with each bank including a DRAM array 212 of rows and columns with accompanying logic. Each bank 210 has a bank address defined by a set of bank address bits. Each row in a bank 210 contains a single memory page, which is the smallest addressable data unit in DRAM device 200, and is typically equal to 4 kB. Each page can be either open or closed. A row buffer 214 keeps the most recently open page. Each bank 210 also includes a row decoder 216 and a column decoder 218.

The DRAM device 200 has three basic interfaces: a command (cmd) interface 220, an address (addr) interface 222, and a data interface 224. The command interface 220 operatively communicates with a command decoder 226 and indicates the type of memory operation: read, write, or refresh. The address interface 222 operatively communicates with row decoder 216 and column decoder 218. The data interface operatively communicates with column decoder 218. A refresh counter 228 is operatively connected between command decoder 226 and row decoder 216.

Figure 3:
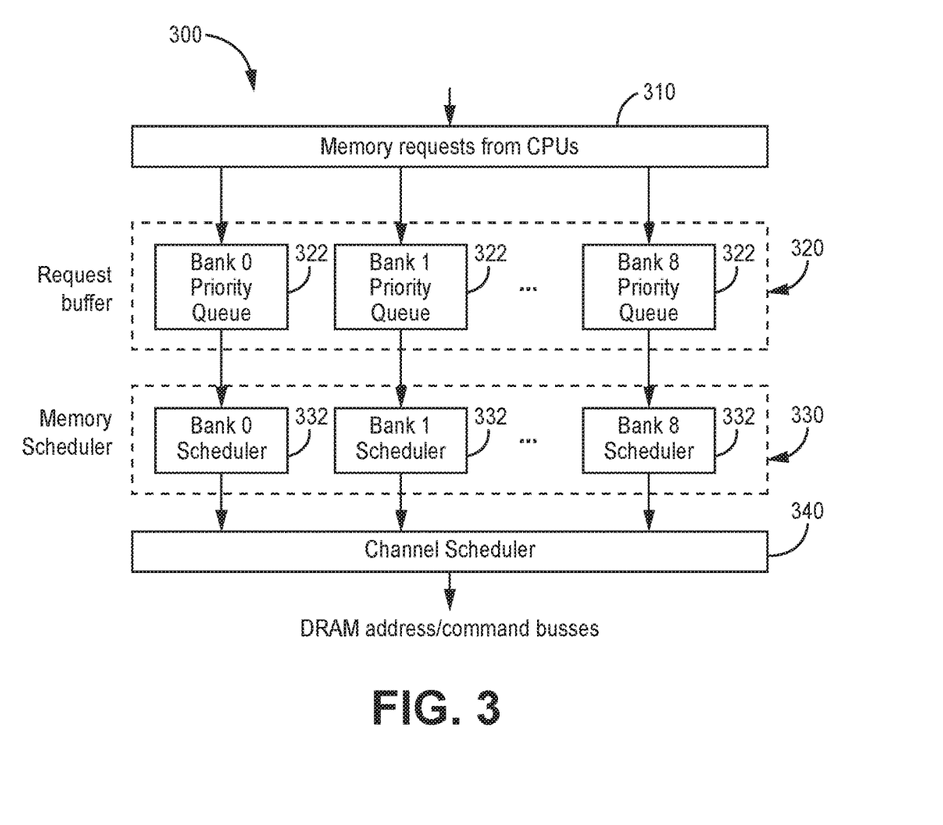
FIG. 3 is a block diagram of the logical structure of a DRAM memory controller, which can be implemented in the multi-core processor architecture of FIG. 1.

FIG. 3 is a block diagram of the logical structure of a DRAM memory controller 300, which can be implemented in the processor unit. The DRAM memory controller 300 receives memory requests from the CPU cores such as through an L3 (block 310). The memory requests are stored in a request buffer 320, which includes respective priority queues 322 for each one of the memory banks (e.g., Bank 0, Bank 1 . . . Bank 8). Once multiple memory requests are present in priority queues 322, a memory scheduler 330 is invoked to select one of the memory requests using a respective bank scheduler 332 in communication with a respective priority queue 322. The selected memory request is then sent to a channel scheduler 340. The channel scheduler 340 communicates with the DRAM address and command busses.

Through the DRAM memory controller, a user can specify the DRAM parameters such as the refresh rate. While a refresh is in progress, the DRAM device is temporarily unavailable for read and write operations. If a high number of pages in the DRAM device are accessed at the same time, then page evictions can appear in the row buffer, resulting in increased memory access times. A mitigation of the row buffer evictions is to allocate a single bank for each processing core.

If multiple CPU cores are simultaneously sending memory requests, then there might be channel scheduler reordering. The usage of multiple memory controllers can mitigate interference delay caused by channel scheduler reordering The present approach implements the memory pools concept for memory partitioning by taking into consideration: the cache index address bits; the address bits to select DRAM banks; the number of active memory ranks, rank bits, and the type of interleaving; and the number of active memory controllers, the granularity and the type of interleaving. Depending on application needs, the present approach is able to achieve various levels of memory access isolation. For example, a single memory pool can be allocated to one memory controller, or a single memory pool can be isolated to specific banks in a specific rank. In general, stricter isolation of the memory accesses results in a lower number of available memory pools.

Figure 4:
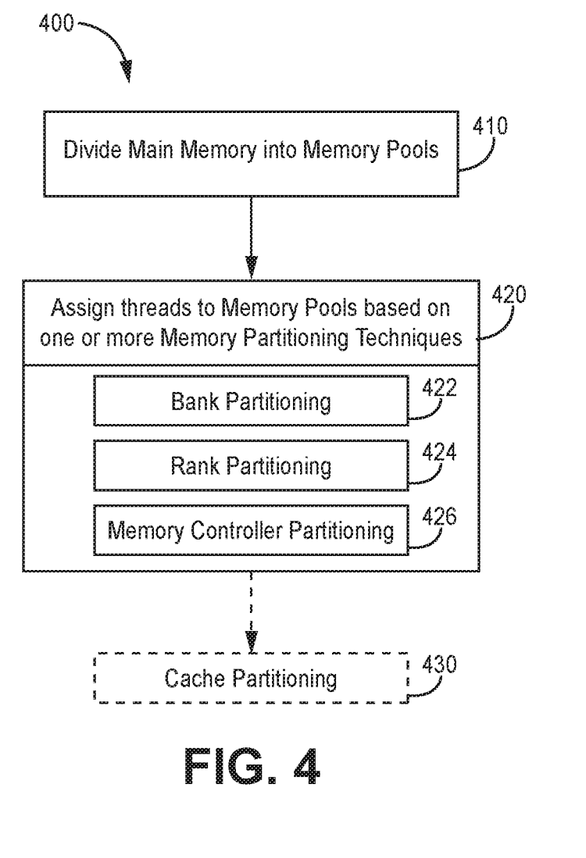
FIG. 4 is a flow diagram of a method for memory partitioning in a computing system, according to one implementation.

FIG. 4 is a flow diagram of a method 400 for implementing memory partitioning according to the present approach. The method 400 comprises dividing a main memory of a computing system into a plurality of memory pools (410). The main memory can include a set of memory devices, such as DRAM devices, arranged in one or more ranks each having a rank address defined by a set of rank address bits. Each of the memory devices comprises one or more banks each having a bank address defined by a set of bank address bits. A plurality of threads, which execute on one or more CPU cores, are assigned to the memory pools based on one or more memory partitioning techniques (block 420), including bank partitioning (block 422), rank partitioning (424), or memory controller partitioning (426). In addition, one or more of these memory partitioning techniques can be optionally used in conjunction with a conventional cache partitioning technique (block 430), which uses cache index address bits to define a size and number of cache partitions.

In some implementations, at least some of the threads are assigned to the same memory pool, or at least some of the threads can be respectively assigned to different memory pools. In addition, at least some of the threads can be mapped onto the same CPU core, or at least some of the threads can be respectively mapped onto different CPU cores. Further, at least some of the memory pools can be respectively mapped, in a one to one (1:1) correspondence, to the memory controllers, the one or more ranks, or the one or more banks. Alternatively, at least some of the memory pools can be respectively mapped, in a one to many (1:N) correspondence, to multiples of the memory controllers, the one or more ranks, and the one or more banks.

The bank partitioning technique uses the bank address bits to define a size and pattern of the memory pools in the main memory. The memory pools are mapped to the main memory with respect to bank address bits and rank address bits. In this technique, the DRAM bank partitions can be used to avoid delays caused by sharing the banks between cores that results in row buffer evictions, and provide an expected performance increase of up to about 30%.

The rank partitioning technique uses the rank address bits to access ranks, such that higher number of ranks results in a higher number of available banks.

A typical memory address layout for a DRAM device is shown in Table 1.

TABLE 1

| Rows | Rank | Bank | Col 1 | Channel | Col 2 | Byte |
|---|---|---|---|---|---|---|
| 31-18 | 17 | 16-14 | 13-7 | 6 | 5-3 | 2-0 |

As the address layout of Table 1 suggests, there are dedicated address bits for the memory banks.

If the processor documentation is limited and information concerning the address layout is missing, then discovery algorithms can be applied to determine the address layout, such as the algorithm proposed by Liu et al., A software memory partition approach for eliminating bank-level interference in multicore systems, In Proc. of the Int'l Conf. on Parallel Architectures and Compilation Techniques (PACT), 2012, pp. 367-376, the disclosure of which is incorporated by reference.

The memory controller partitioning technique can be implemented on a 32 bits system, and uses memory controller interleaving, which takes into account the granularity and the type of interleaving. The memory controller interleaving can be used to fairly or evenly distribute the memory requests to multiple memory controllers, or can be used to completely isolate the memory requests to a particular memory controller. In a 64 bits system, the memory controller partitioning could be implemented by disabling the memory controller interleaving while having all memory controllers to be accessible.

When a cache partitioning technique is employed, memory pools are mapped to the main memory with respect to cache index address bits. Further details related to cache partitioning techniques are described in U.S. Pat. No. 8,069,308, entitled CACHE POOLING FOR COMPUTING SYSTEMS, and in U.S. Publication No. 2015/0205724, entitled SYSTEM AND METHOD OF CACHE PARTITIONING FOR PROCESSORS WITH LIMITED CACHED MEMORY POOLS, the disclosures of which are both incorporated by reference herein.

Depending on the memory address layout, either 1:1 (one to one) or 1:N (one to many) mappings of the memory pools can be made among the cache, memory controller, ranks, and banks.

Experimental studies were conducted with respect to DRAM bank partitioning to demonstrate its benefits. These studies were done with a COTS multi-core processor, using a Deos Real-Time Operating System (RTOS) from DDC-I. The COTS multi-core processor has twelve physical CPUs, with each physical CPU having two hardware threads, resulting in a total of 24 virtual CPUs. Each virtual CPU has its own tiny instruction and data L1 cache, 32 KB in size. The virtual CPUs are grouped in three clusters, with eight virtual CPUs in each cluster. Each cluster has its own L2 cache, equal to 2 MB. All clusters are connected to an on-chip interconnect. The DRAM memory is mapped to three memory controllers, where each memory controller has a dedicated L3 cache size of 512 KB.

The benefits of DRAM bank partitioning were demonstrated by a set of uncached memory accesses simultaneously triggered to the same and different DRAM banks. As uncached memory accesses are employed, the assumption is made that the presence or absence of caches has no effect on the measured execution times. Nevertheless, in the experiments that follow, the L3 cache (platform cache) is disabled. The experiments conducted are with respect to two processes, worker and trasher processes, with both processes being iteratively invoked.

The worker process has two threads, including writer and reader threads. The writer thread writes a predefined number of pages to a memory array larger than its memory pool. When the writer thread finishes, the reader thread reads the pages and computes a checksum of the memory array. Both threads in the worker process share the same memory pool. At the end of a single thread iteration, the cache is invalidated to guarantee that all memory requests from the worker threads are uncached.

The trasher process has multiple trasher threads. The trasher threads continuously write a high number of pages into a memory array, such that the accessed memory is as large as or larger than the allocated memory pool. Therefore, the trasher process is capable of continuously performing uncached writes and stress in the memory hierarchy. The trasher process runs in parallel with the worker process, with slack usage enabled. Trasher threads are mapped on CPUs different than the CPUs where the worker process threads are running.

Figure 5:
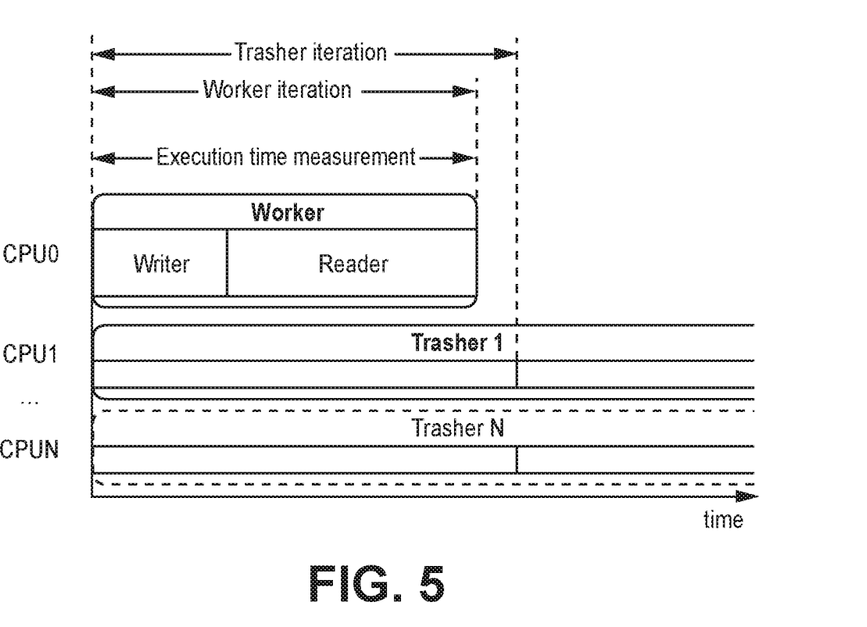
FIG. 5 is a graphical depiction of a threads mapping and execution timeline for worker and trasher process iterations in a COTS multi-core processor.

FIG. 5 is a graphical depiction of the threads mapping and execution timeline for the worker and trasher process iterations. The worker process threads, including writer and reader, are mapped to CPU0, while the trasher threads ran on the remaining seven CPUs in the same cluster (CPU1 to CPUN). The execution time measurement is indicated for the writer and/or reader timings.

Figure 6:
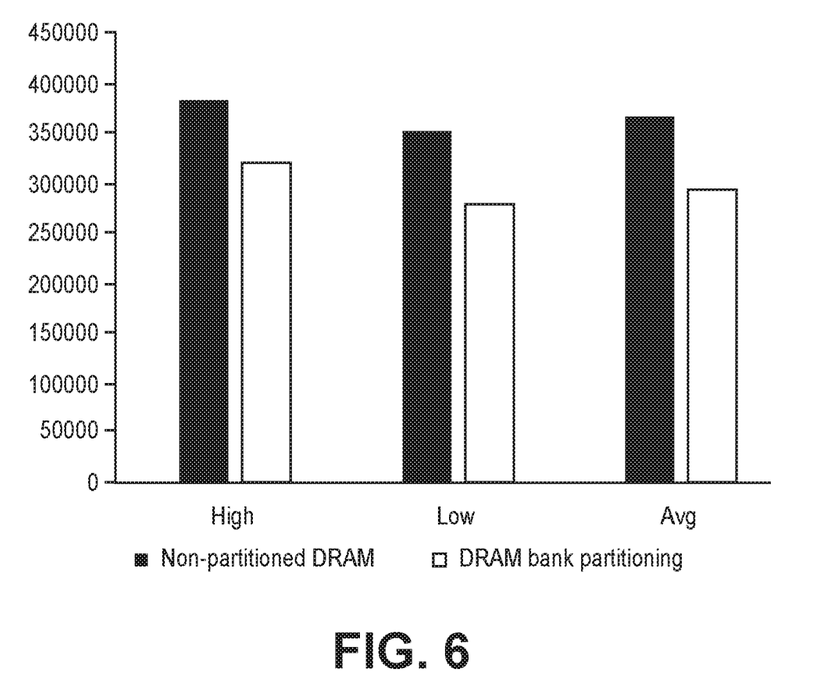
FIG. 6 is a graph showing execution times of a worker process for both a non-partitioned DRAM and a DRAM bank partitioning.

FIG. 6 is a graph showing execution times of the worker process for both non-partitioned DRAM and the DRAM bank partitioning. The listed performance results are for the highest measured, the lowest measured, and the average execution times over 100 thread iterations. To outline the benefits of the DRAM bank partitioning with memory pools, the non-partitioned DRAM is compared with the DRAM bank partitioning. The non-partitioned DRAM is implemented by placing the trasher threads to the same memory pool as the worker and reader threads. The DRAM bank partitioning is implemented by placing the trasher thread in a separate memory pool. The worker and trasher memory pools are defined by taking into account the address bits used for the DRAM banks. As the experimental data shows, the DRAM bank partitioning reduced the execution time cycle for each processing core by about 20% over the non-partitioned DRAM, thereby yielding an additional 20% of CPU performance.

Additional experimental results have suggested that cache partitioning can yield a performance improvement of up to about 60% over non-partitioned cache when an application's operational data set can be completely cache resident (and that cache can be protected from crosscore eviction/pollution). Because cache sizes are often too small to support 100% cache residence for most applications, a combination of the cache partitioning and DRAM bank partitioning yields: reduced worst-case memory transaction counts and reduced worst-case execution for each application (by virtue of the cache partitioning); and the lowest possible DRAM access times for those memory transactions which do occur (by virtue of the DRAM bank partitioning).

A computer or processor used in the present system and method can be implemented using software, firmware, hardware, or any appropriate combination thereof, as known to one of skill in the art. By way of example and not limitation, hardware components can include one or more microprocessors, memory elements, Digital Signal Processing (DSP) elements, interface cards, and other standard components known in the art. These may be supplemented by, or incorporated in, specially-designed Application Specific Integrated Circuits (ASICs) or Field Programmable Gate Arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

EXAMPLE EMBODIMENTS

Example 1 includes a computing system, comprising: at least one processing unit; at least one memory controller in operative communication with the at least one processing unit, with or without cache; and a main memory in operative communication with the at least one processing unit through the at least one memory controller. A memory hierarchy of the computing system includes at least one cache, the at least one memory controller, and the main memory, wherein the memory hierarchy is divided into a plurality of memory pools. The main memory comprises a set of memory modules split in ranks each having a rank address defined by a set of rank address bits, and each rank having a set of memory devices, each of the memory devices comprising one or more banks each having a bank address defined by a set of bank address bits. A plurality of threads execute on the at least one processing unit and are assigned to the memory pools based on one or more memory partitioning techniques comprising: bank partitioning, which uses the bank address bits to define a size and pattern of one or more of the memory pools; rank partitioning, which uses the rank address bits to access the one or more ranks; or memory controller partitioning, which uses memory controller interleaving.

Example 2 includes the computing system of Example 1, wherein the main memory comprise Dynamic Random Access Memory (DRAM).

Example 3 includes the computing system of any of Examples 1-2, wherein the threads are also assigned to the memory pools based on a cache partitioning technique, which uses cache index address bits to define a size and number of cache partitions.

Example 4 includes the computing system of any of Examples 1-3, wherein at least some of the threads are assigned to the same memory pool.

Example 5 includes the computing system of any of Examples 1-3, wherein at least some of the threads are respectively assigned to different memory pools.

Example 6 includes the computing system of any of Examples 1-5, wherein the at least one processing unit comprises one or more Central Processing Unit (CPU) cores.

Example 7 includes the computing system of Example 6, wherein at least some of the threads are mapped onto the same CPU core.

Example 8 includes the computing system of Example 6, wherein at least some of the threads are respectively mapped onto different CPU cores.

Example 9 includes the computing system of any of Examples 1-8, wherein at least some of the memory pools are respectively mapped, in a one to one (1:1) correspondence, to the at least one memory controller, the one or more ranks, or the one or more banks.

Example 10 includes the computing system of any of Examples 1-8, wherein at least some of the memory pools are respectively mapped, in a one to many (1:N) correspondence, to multiples of the at least one memory controller, the one or more ranks, and the one or more banks.

Example 11 includes an avionics computer system, comprising: a multi-core processor unit, comprising: one or more processor clusters, each of which comprise a plurality of central Central Processing Unit (CPU) cores, each of the cores having a private level first cache and a shared level second cache; an interconnect operatively coupled to the one or more processor clusters; and one or more memory controllers in operative communication with the one or more processor clusters through the interconnect. A main memory is in operative communication with the one or more processor clusters through the one or more memory controllers. A memory hierarchy of the avionics computer system includes at least one of the first or second caches, the one or more memory controllers, and the main memory, wherein the memory hierarchy is divided into a plurality of memory pools. The main memory comprises a set of Dual In-line Memory Modules (DIMMs) split in ranks each having a rank address defined by a set of rank address bits, and each rank having a set of Dynamic Random Access Memory (DRAM) devices, each of the DRAM devices comprising one or more banks each having a bank address defined by a set of bank address bits. A plurality of threads execute on the CPU cores. The threads are assigned to the memory pools based on one or more memory partitioning techniques comprising: bank partitioning, which uses the bank address bits to define a size and pattern of one or more of the memory pools; rank partitioning, which uses the rank address bits to access the one or more ranks; or memory controller partitioning, which uses memory controller interleaving to either fairly distribute the memory requests to multiple memory controllers or completely isolate the memory requests to a particular memory controller. The avionics computer system is implemented as part of an avionics platform onboard an aircraft.

Example 12 includes the avionics computer system of Example 11, wherein one or more of the threads are also assigned to one or more of the memory pools based on a cache partitioning technique, which uses cache index address bits to define a size and number of cache partitions.

Example 13 includes the avionics computer system of any of Examples 11-12, wherein at least some of the threads are assigned to the same memory pool.

Example 14 includes the avionics computer system of any of Examples 11-12, wherein at least some of the threads are respectively assigned to different memory pools.

Example 15 includes the avionics computer system of any of Examples 11-14, wherein at least some of the threads are mapped onto the same CPU core.

Example 16 includes the avionics computer system of any of Examples 11-14, wherein at least some of the threads are respectively mapped onto different CPU cores.

Example 17 includes the avionics computer system of any of Examples 11-16, wherein at least some of the memory pools are respectively mapped, in a one to one (1:1) correspondence, to the one or more memory controllers, the one or more ranks, or the one or more banks.

Example 18 includes the avionics computer system of any of Examples 11-16, wherein at least some of the memory pools are respectively mapped, in a one to many (1:N) correspondence, to multiples of the one or more memory controllers, the one or more ranks, and the one or more banks.

Example 19 includes a method of operating a computing system, the method comprising: dividing a memory hierarchy of the computing system into a plurality of memory pools, the memory hierarchy including at least one cache, at least one memory controller, and a main memory; wherein the main memory comprises a set of memory modules split in ranks each having a rank address defined by a set of rank address bits, and each rank having a set of memory devices, each of the memory devices comprising one or more banks each having a bank address defined by a set of bank address bits; and assigning each of a plurality of threads, which execute on at least one processing unit in the computing system, to one or more of the memory pools based on one or more memory partitioning techniques comprising: bank partitioning, which uses the bank address bits to define a size and pattern of one or more of the memory pools; rank partitioning, which uses the rank address bits to access the one or more ranks; or memory controller partitioning, which uses memory controller interleaving to either fairly distribute the memory requests to multiple memory controllers or completely isolate the memory requests to a particular memory controller.

Example 20 includes the method of Example 19, wherein one or more of the threads are also assigned to one or more of the memory pools based on a cache partitioning technique, which uses cache index address bits to define a size and number of cache partitions.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A computing system, comprising:
   at least one processing unit;
   at least one memory controller in operative communication with the at least one processing unit, with or without cache; and
   a main memory in operative communication with the at least one processing unit through the at least one memory controller;
   wherein a memory hierarchy of the computing system includes at least one cache, the at least one memory controller, and the main memory, wherein the memory hierarchy is divided into a plurality of memory pools;
   wherein the main memory comprises a set of memory modules split in ranks each having a rank address defined by a set of rank address bits, and each rank having a set of memory devices, each of the memory devices comprising one or more banks each having a bank address defined by a set of bank address bits;
   wherein a plurality of threads execute on the at least one processing unit and are assigned to the memory pools based on memory partitioning techniques comprising:
      bank partitioning, which uses the bank address bits to define a size and pattern of one or more of the memory pools;
      rank partitioning, which uses the rank address bits to access the one or more ranks; and
      memory controller partitioning, which uses memory controller interleaving to isolate memory requests to the at least one memory controller;
   wherein the system provides levels of memory pool access isolation comprising:
      a single memory pool allocated to the at least one memory controller; and
      a single memory pool isolated to the one or more banks in one or more of the ranks.

2. The computing system of claim 1, wherein the main memory comprises Dynamic Random Access Memory (DRAM).

3. The computing system of claim 1, wherein the threads are also assigned to the memory pools based on a cache partitioning technique, which uses cache index address bits to define a size and number of cache partitions.

4. The computing system of claim 1, wherein at least some of the threads are assigned to the same memory pool.

5. The computing system of claim 1, wherein at least some of the threads are respectively assigned to different memory pools.

6. The computing system of claim 1, wherein the at least one processing unit comprises one or more Central Processing Unit (CPU) cores.

7. The computing system of claim 6, wherein at least some of the threads are mapped onto the same CPU core.

8. The computing system of claim 6, wherein at least some of the threads are respectively mapped onto different CPU cores.

9. The computing system of claim 1, wherein at least some of the memory pools are respectively mapped, in a one to one (1:1) correspondence, to the at least one memory controller, the one or more ranks, or the one or more banks.

10. The computing system of claim 1, wherein at least some of the memory pools are respectively mapped, in a one to many (1:N) correspondence, to multiples of the at least one memory controller, the one or more ranks, and the one or more banks.

11. An avionics computer system, comprising:
    a multi-core processor unit, comprising:
       one or more processor clusters, each of which comprise a plurality of Central Processing Unit (CPU) cores, each of the cores having a private level first cache and a shared level second cache;
       an interconnect operatively coupled to the one or more processor clusters; and
       one or more memory controllers in operative communication with the one or more processor clusters through the interconnect;
    a main memory in operative communication with the one or more processor clusters through the one or more memory controllers,
    wherein a memory hierarchy of the avionics computer system includes at least one of the first or second caches, the one or more memory controllers, and the main memory, wherein the memory hierarchy is divided into a plurality of memory pools;
    wherein the main memory comprises a set of Dual In-line Memory Modules (DIMMs) split in ranks each having a rank address defined by a set of rank address bits, and each rank having a set of Dynamic Random Access Memory (DRAM) devices, each of the DRAM devices comprising one or more banks each having a bank address defined by a set of bank address bits;
    wherein a plurality of threads execute on the CPU cores, wherein the threads are assigned to the memory pools based on memory partitioning techniques comprising:
       bank partitioning, which uses the bank address bits to define a size and pattern of one or more of the memory pools;
       rank partitioning, which uses the rank address bits to access the one or more ranks;
       memory controller partitioning, which uses memory controller interleaving to isolate memory requests to at least one of the one or more memory controllers; and
       a cache partitioning technique, which uses cache index address bits to define a size and number of cache partitions;
    wherein the avionics computer system provides levels of memory pool access isolation comprising:
       a single memory pool allocated to at least one of the one or more memory controllers;
       a single memory pool isolated to the one or more banks in one or more of the ranks; and
       a single memory pool isolated to at least one of the cache partitions;
    wherein the avionics computer system is implemented as part of an avionics platform onboard an aircraft.

12. The avionics computer system of claim 11, wherein at least some of the threads are assigned to the same memory pool.

13. The avionics computer system of claim 11, wherein at least some of the threads are respectively assigned to different memory pools.

14. The avionics computer system of claim 11, wherein at least some of the threads are mapped onto the same CPU core.

15. The avionics computer system of claim 11, wherein at least some of the threads are respectively mapped onto different CPU cores.

16. The avionics computer system of claim 11, wherein at least some of the memory pools are respectively mapped, in a one to one (1:1) correspondence, to the one or more memory controllers, the one or more ranks, or the one or more banks.

17. The avionics computer system of claim 11, wherein at least some of the memory pools are respectively mapped, in a one to many (1:N) correspondence, to multiples of the one or more memory controllers, the one or more ranks, and the one or more banks.

18. A method of operating a computing system, the method comprising:
dividing a memory hierarchy of the computing system into a plurality of memory pools, the memory hierarchy including at least one cache, at least one memory controller, and a main memory;
wherein the main memory comprises a set of memory modules split in ranks each having a rank address defined by a set of rank address bits, and each rank having a set of memory devices, each of the memory devices comprising one or more banks each having a bank address defined by a set of bank address bits; and
assigning each of a plurality of threads, which execute on at least one processing unit in the computing system, to one or more of the memory pools based on memory partitioning techniques comprising:
bank partitioning, which uses the bank address bits to define a size and pattern of one or more of the memory pools;
rank partitioning, which uses the rank address bits to access the one or more ranks; and
memory controller partitioning, which uses memory controller interleaving to isolate memory requests to the at least one memory controller;
wherein the method provides levels of memory pool access isolation comprising:
allocating a single memory pool to the at least one memory controller; and
isolating a single memory pool to the one or more banks in one or more of the ranks.

19. The method of claim 18, wherein one or more of the threads are also assigned to one or more of the memory pools based on a cache partitioning technique, which uses cache index address bits to define a size and number of cache partitions.

\* \* \* \* \*